(12) United States Patent
Brunnmayr

(10) Patent No.: US 8,991,010 B2
(45) Date of Patent: Mar. 31, 2015

(54) DAMPING DEVICE FOR MOVABLE FURNITURE PARTS

(71) Applicant: Julius Blum GmbH, Hoechst (AT)

(72) Inventor: Harald Brunnmayr, Hoerbranz (AT)

(73) Assignee: Julius Blum GmbH, Hoechst (AT)

( * ) Notice: Subject to any disclaimer, the term of this patent is extended or adjusted under 35 U.S.C. 154(b) by 0 days.

(21) Appl. No.: 14/184,910

(22) Filed: Feb. 20, 2014

(65) Prior Publication Data

US 2014/0165333 A1    Jun. 19, 2014

Related U.S. Application Data

(63) Continuation of application No. PCT/AT2012/000187, filed on Jul. 13, 2012.

(30) Foreign Application Priority Data

Aug. 31, 2011    (AT) ................. A 1243/2011

(51) Int. Cl.
| | | |
|---|---|---|
| *E05D 11/10* | (2006.01) | |
| *E05F 3/20* | (2006.01) | |
| *E05F 5/00* | (2006.01) | |

(Continued)

(52) U.S. Cl.
CPC . *E05F 3/20* (2013.01); *E05F 5/006* (2013.01); *E05F 5/02* (2013.01); *E05F 3/04* (2013.01); *E05F 3/10* (2013.01); *F16F 9/08* (2013.01); *F16F 13/007* (2013.01);

(Continued)

(58) Field of Classification Search
USPC ......... 16/72, 85, 319, 321, 322, 335, DIG. 10
See application file for complete search history.

(56) References Cited

U.S. PATENT DOCUMENTS

| 2,371,705 A | 3/1945 | O'Connor |
|---|---|---|
| 2003/0075845 A1 | 4/2003 | Krammer |

(Continued)

FOREIGN PATENT DOCUMENTS

| DE | 43 28 696 | 3/1995 |
|---|---|---|
| DE | 199 01 517 | 7/2000 |

(Continued)

OTHER PUBLICATIONS

International Search Report (ISR) issued Nov. 2, 2012 in International (PCT) Application No. PCT/AT2012/000187.

(Continued)

*Primary Examiner* — Roberta Delisle
(74) *Attorney, Agent, or Firm* — Wenderoth, Lind & Ponack, L.L.P.

(57) ABSTRACT

A damping device for movable furniture part, includes a damper housing, a fluid chamber which is arranged in the damper housing and in which a piston is movably mounted, a tappet which is connected to the piston, at least one seal being arranged between the damper housing and the tappet in order to seal the fluid chamber, wherein the tappet passes through the seal, a compensating chamber which is fluidically connected to the fluid chamber, which runs laterally parallel to the fluid chamber. At least one deformable compensating body is arranged in the compensating chamber in order to compensate for a volume change due to the tappet being immersed into the fluid chamber. The deformable compensating body and the at least one seal are designed together as a single piece.

15 Claims, 7 Drawing Sheets

(51) Int. Cl.
*E05F 5/02* (2006.01)
*E05F 3/04* (2006.01)
*E05F 3/10* (2006.01)
*F16F 9/08* (2006.01)
*F16F 13/00* (2006.01)

(52) U.S. Cl.
CPC ....... *E05Y 2201/21* (2013.01); *E05Y 2201/254* (2013.01); *E05Y 2201/264* (2013.01); *E05Y 2900/20* (2013.01)
USPC .......................................................... 16/319

(56) References Cited

U.S. PATENT DOCUMENTS

| | | | |
|---|---|---|---|
| 2008/0168620 A1* | 7/2008 | Hammerle | 16/85 |
| 2010/0269294 A1* | 10/2010 | Krammer | 16/308 |
| 2011/0291538 A1* | 12/2011 | Brunnmayr | 312/326 |
| 2011/0298349 A1* | 12/2011 | Sutterlutti | 312/326 |
| 2012/0085607 A1 | 4/2012 | Weber | |
| 2013/0139354 A1 | 6/2013 | Brunnmayr | |

FOREIGN PATENT DOCUMENTS

| | | |
|---|---|---|
| DE | 10 2007 031 175 | 10/2008 |
| DE | 20 2009 004 752 | 9/2010 |
| EP | 1 241 374 | 9/2002 |
| JP | 57-40138 | 3/1982 |
| JP | 60-18631 | 1/1985 |
| WO | 2010/108201 | 9/2010 |
| WO | 2010/108203 | 9/2010 |

OTHER PUBLICATIONS

Austrian Patent Office Search Report (ASR) issued Apr. 10, 2012 in Austrian Patent Application No. A 1243/2011.

* cited by examiner

DAMPING DEVICE FOR MOVABLE FURNITURE PARTS

BACKGROUND OF THE INVENTION

The present invention concerns a damping device for moveable furniture parts, comprising:
a damper housing,
a fluid chamber arranged in the damper housing and in which a piston is moveably supported, and
a ram connected to the piston. Arranged between the damper housing and the ram is at least one seal for sealing off the fluid chamber, and the ram passes through the seal.
In addition, a compensating chamber which is in fluid-conducting relationship with the fluid chamber extends laterally parallel to the fluid chamber and there there is arranged at least one deformable compensating body in the compensating chamber for compensation for a change in volume due to the ram immersing into the fluid chamber.

The damping action of fluid dampers is substantially based on the flow resistance of a damping fluid present in a fluid chamber. When the piston is subjected to pressure, it is displaced relative to the fluid chamber, in which case the fluid flows from one cylinder chamber into another cylinder chamber by way of through-flow openings of the piston or between the piston and fluid chamber. In order to prevent the liquid damping medium from escaping from the damper, the ram or the piston rod is sealed relative to the fluid chamber by a seal, wherein the ram or the piston rod is slidingly displaceable against that seal. The compensating chamber is provided to compensate for the volume of the piston rod or ram as it moves into or out of the fluid chamber so that failure of the damping device due to the increased pressure loading of the inwardly moving piston rod is prevented.

WO 2010/108203 A1 to the present applicant discloses a furniture hinge having a damping device which has two fluid chambers connected by way of a passage. Arranged in one fluid chamber is a device having a displaceable piston or a displaceable material portion provided to compensate for the volume of the piston rod.

DE 199 01 517 A1 describes a door closer having a hydraulic piston-cylinder unit, wherein a compensating body forming the pressure compensating space is arranged in one of the hydraulic spaces. The compensating body is connected to a piston component and is of a bag-form configuration, wherein the inwardly moving volume of the piston rod can be compensated by the compensating body present in the hydraulic space.

EP 1 241 374 A1 and JP 60-018631 respectively describe damping devices having a piston guided in a fluid chamber and a compensating chamber extending parallel to the fluid chamber, wherein the seal arranged between the damper housing and the ram and the compressible material disposed in the compensating chamber are formed separately from each other.

In the state of the art, a relatively large number of individual parts are necessary for the damping device, and those parts, due to the desired compact structure of furniture dampers, are additionally very small and delicate, in which respect assembly of the damper is also relatively complicated and laborious.

SUMMARY OF THE INVENTION

Therefore the object of the present invention is to provide a damping device of the general kind set forth in the opening part of this specification, while avoiding the above-mentioned disadvantages.

According to the invention, it is therefore provided that the deformable compensating body and the at least one seal are of a one-piece configuration.

In that way the number of required components for the damping device can be reduced, and also the one-piece design of the compensating body with the seal results in a more robust structure and is thus less susceptible to trouble.

The material of the compensating body with the seal formed thereon can be formed from plastic, for example a thermoplastic material or an elastomer or also a mixture of those materials, wherein it is preferably provided that this one-piece component is formed from rubber.

The compensating body can be in the form of a hollow body which is preferably filled with air and which is of a fluid-tight nature. That has the advantage over conventional compensating bodies of foam that the air contained in the foam can no longer be dissolved in the damping medium (for example in silicone oil), thereby ensuring linear volume compensation even after numerous damping stroke movements.

In a possible embodiment the compensating body can be of a substantially bag-form configuration which in the rest position substantially completely fills the compensating chamber and is compressible in a damping stroke movement.

In a possible embodiment it can be provided that a sealing body is arranged in the compensating chamber to seal off the compensating chamber, wherein the compensating body, the seal and the sealing body are provided jointly in one piece. In that way the number of components required for the damper can be reduced even more.

The furniture hinge according to the invention is characterised by at least one damping device of the kind in question.

BRIEF DESCRIPTION OF THE DRAWINGS

Further details and advantages of the invention will be described by means of the embodiment by way of example illustrated in the drawings, in which.

DETAILED DESCRIPTION OF THE INVENTION

Figure 1:
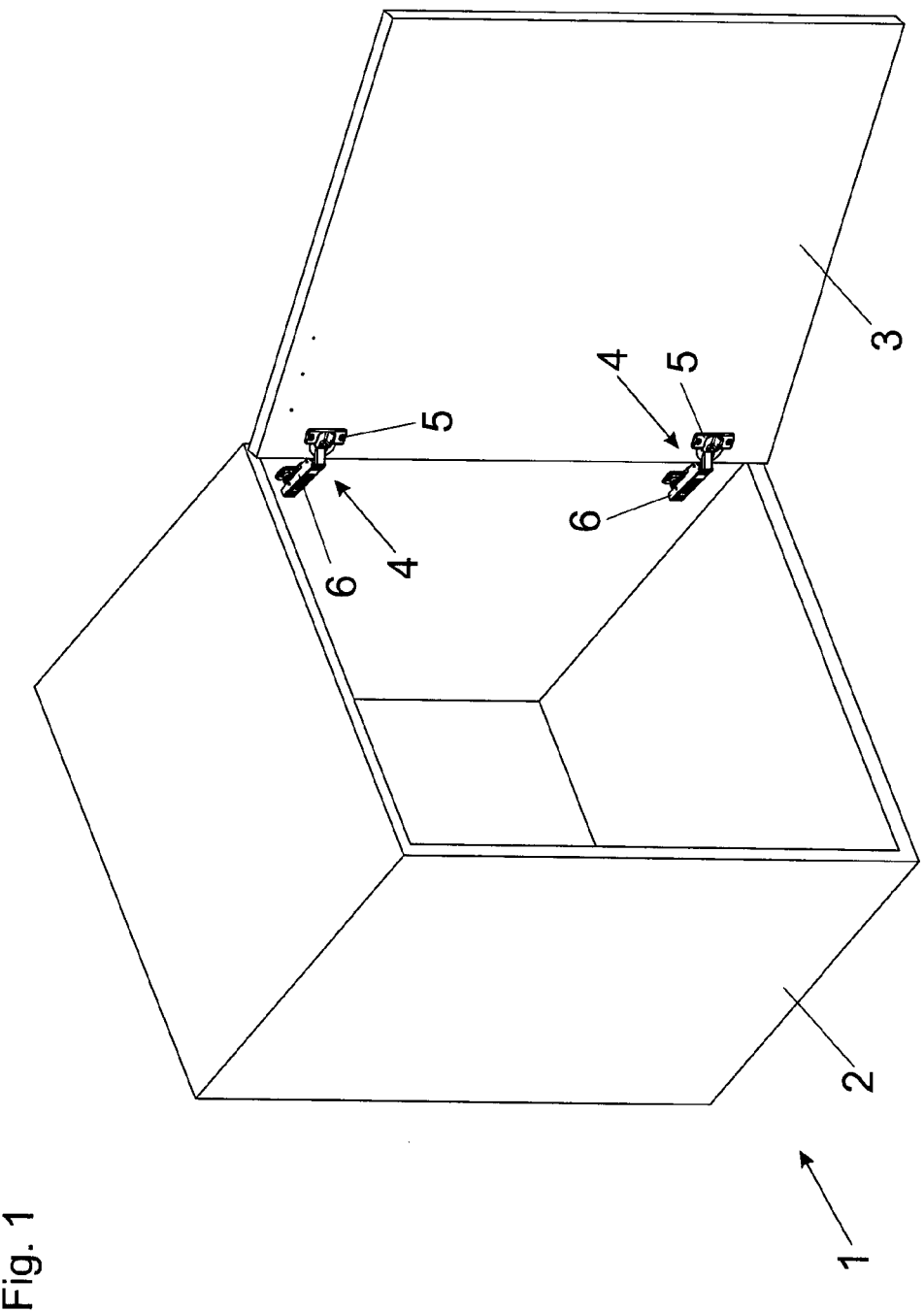
FIG. 1 shows a perspective view of an article of furniture in cabinet form with a pivotably mounted door.

FIG. 1 shows a perspective view of an article of furniture 1, wherein a door 3 is mounted pivotably by way of furniture hinges 4 relative to a furniture carcass 2. In a known manner, the furniture hinges 4 have a hinge cup 5 hingedly connected to a carcass-side fitment portion in the form of a hinge arm 6. The furniture hinges 4 each have a damping device 7 (not visible here) for damping a hinge movement, and it is preferably provided that the damping device 7 is mounted in or on the hinge cup 5. In particular it can be provided that at least one damping device 7 is mounted to the outside of the hinge cup 5, wherein the hinge cup 5 together with at least one damping device 7 arranged thereon can jointly be fitted within a provided furniture standard bore in the door 3 and are arranged within a notional diameter of the bore.

Figure 2:
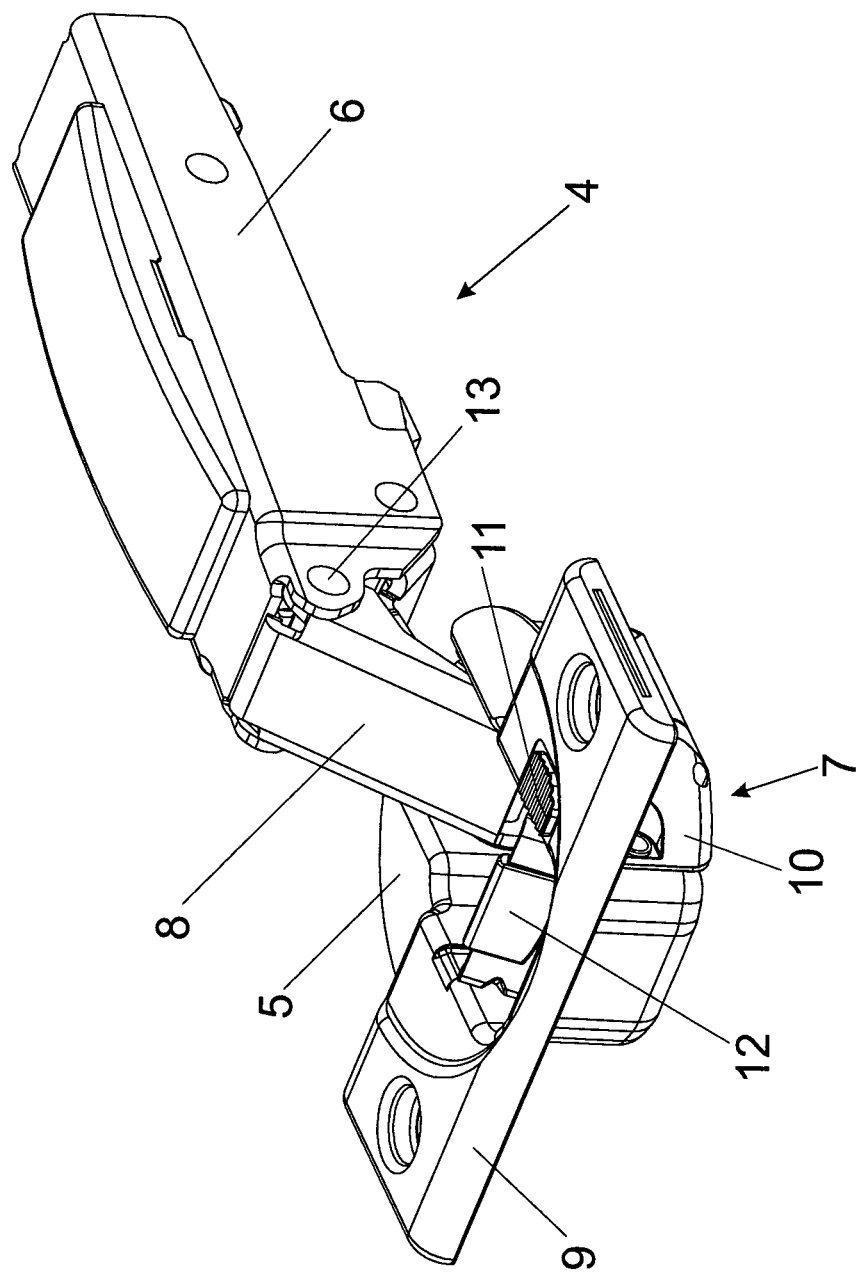
FIG. 2 shows a perspective view of a furniture hinge with a damping device.

FIG. 2 shows a perspective view of a furniture hinge 4, wherein the hinge cup 5 is pivotably connected to the hinge arm 6 by way of at least one hinge lever 8. The hinge cup 5 is provided with a fixing flange 9, wherein at least one damping device 7 is mounted with a damper housing 10 beneath the fixing flange 9 and at the outside of the hinge cup 5. The damping device 7 has a switch 11 which is to be adjusted by a person and by which the damping action of the damping device 7 can be completely deactivated, if desired. Provided within the hinge cup 5 is a pivotably mounted actuating element 12 which towards the end of the closing movement of the hinge 4 can be acted upon by the hinge lever 8 and can be pressed in thereby in the direction of the bottom of the hinge cup. That last closing movement can be damped by the provided damping device 7. The actuating element 12 is preferably mounted pivotably about an axis parallel to the axis of rotation 13.

Figure 3A:
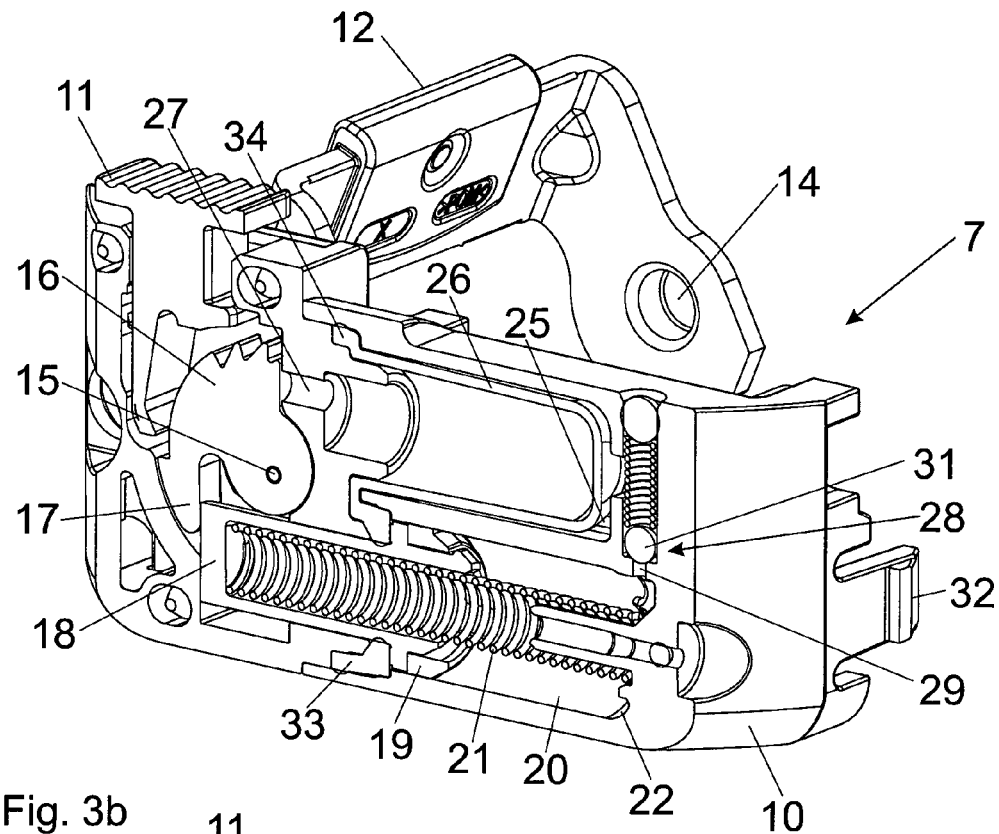
FIGS. 3a and 3b show two different sectional views of the damping device, the piston being in a readiness position.
Figure 3B:
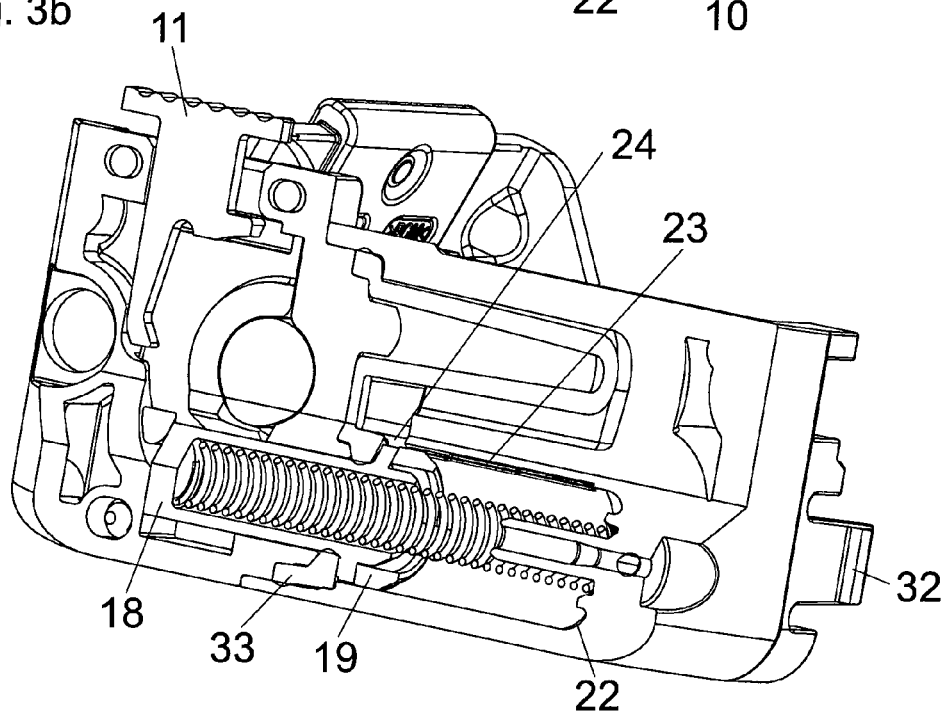

FIGS. 3a and 3b show two different perspective sectional views of the damping device 7. It is possible to see the actuating element 12 which is mounted rotatably about a pivot axis 14 relative to the hinge cup 5 and which towards the end of the closing movement can be acted upon by the hinge lever 8 which engages into the hinge cup 5 (FIG. 2). A lever 16 mounted pivotably about the axis of rotation 15 is motionally coupled to the actuating element 12 so that therefore the lever 16 always moves with a movement of the actuating element 12. The lever 16 has a lever arm 17 which bears against a ram 18 (or a piston rod, respectively). The ram 18 is connected to a piston 19 mounted displaceably in a fluid chamber 20 of the damper housing 10. After a damping stroke movement has occurred, the ram 18 (and therewith the piston 19) can be returned again into a ready position for the next damping stroke movement, by way of a return spring 21 arranged in the fluid chamber 20. In FIGS. 3a and 3b the piston 19 is in such a ready position. The fluid chamber 20 is filled with a hydraulic damping fluid which, upon a displacement of the piston 19 in the direction of the end 22 of the fluid chamber 20, can flow laterally past the piston 19 between the piston 19 and the inside wall 23 (FIG. 3b) of the fluid chamber 20 and can flow through a passage 24 (FIG. 3b) into a compensating chamber 25 in which a deformable compensating body 26 is arranged. That compensating body 26 serves to compensate for the volume of the ram 18 as it moves into the fluid chamber 20. As can be clearly seen from FIG. 3a, the compensating body 26 in the rest position is of a substantially bag-form configuration and substantially completely fills the compensating chamber 25. The compensating body 26 is filled with air and in the damping stroke movement—that is to say when the ram 18 is moved in the direction towards the end 22 of the fluid chamber 20—can be elastically deformed by the volume of fluid streaming into the compensating chamber 26, wherein air can escape through an opening 27 of the damper housing 10. When the ram 18 is moved back into the ready position again by the force of the return spring 21, then the damping fluid in the compensating chamber 25 can flow back into the fluid chamber 20 again due to the reduced pressure caused thereby and the compensating body 26 can again assume the bag-form shape shown in FIG. 3a, due to the incoming air flowing through the opening 27. There is also provided an overload prevention means 28 by which at least one overload opening 29 between the fluid chamber 20 and the compensating chamber 25 can be opened above a threshold value of a pressure acting on the ram 18. The overload prevention means 28 includes a ball 31 which is pre-stressed by a spring 30 and which when a predetermined fluid pressure is exceeded opens the overload opening 29 so that in an overload situation the damping fluid can flow across from the fluid chamber 20 into the compensating chamber 25. When the fluid pressure falls below the predetermined pressure, the overload opening 29 is closed again by the spring-loaded ball 31.

A seal 33 which seals off the ram 18 relative to the damper housing 10 and which is provided jointly in one piece with the compensating body 26 is essential. In the illustrated embodiment, it is also provided that the sealing body 34 which seals off the compensating chamber 25 relative to the damper housing 10 is formed jointly in one piece with the seal 33 and the compensating body 26.

FIG. 3b shows another sectional view of the damping device 7 of FIG. 3a, wherein it is possible to see the gap which remains between the piston 19 and the inside wall 23 of the fluid chamber 20 and through which the damping fluid can flow from one side of the piston to the other. To influence the damping action, the inside wall 23 of the fluid chamber 20 can have grooves which are of a narrowing flow cross-section in the direction of the end 22, whereby adaptive damping can be implemented. It is possible to see the switch 11 for deactivating the damping function and at least one resilient latching element 32 for—preferably releasably—fixing the damping device 7 to the hinge cup 5. To provide a particularly compact damping device 7, it can be provided that the fluid chamber 20 has a first longitudinal axis and the compensating chamber 25 has a second longitudinal axis, the first longitudinal axis of the fluid chamber 20 and the second longitudinal axis of the compensating chamber 25 extending in substantially parallel mutually spaced relationship.

Figure 4A:
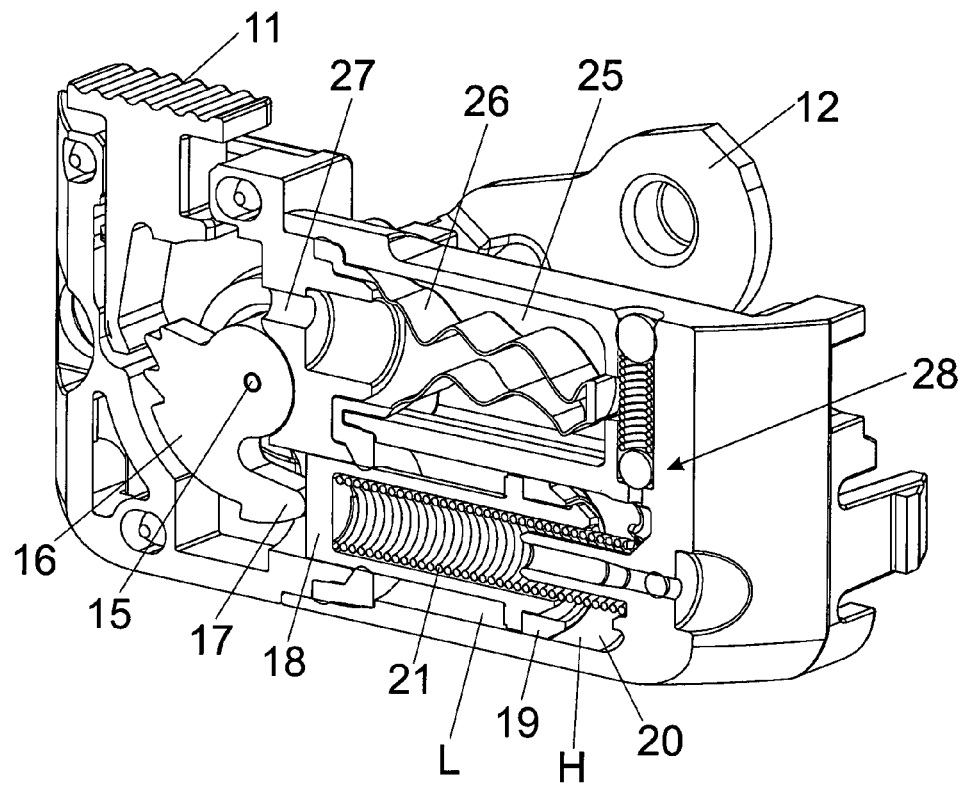
FIGS. 4a and 4b show two different sectional views of the damping device, the piston being in a pressed-in position.
Figure 4B:
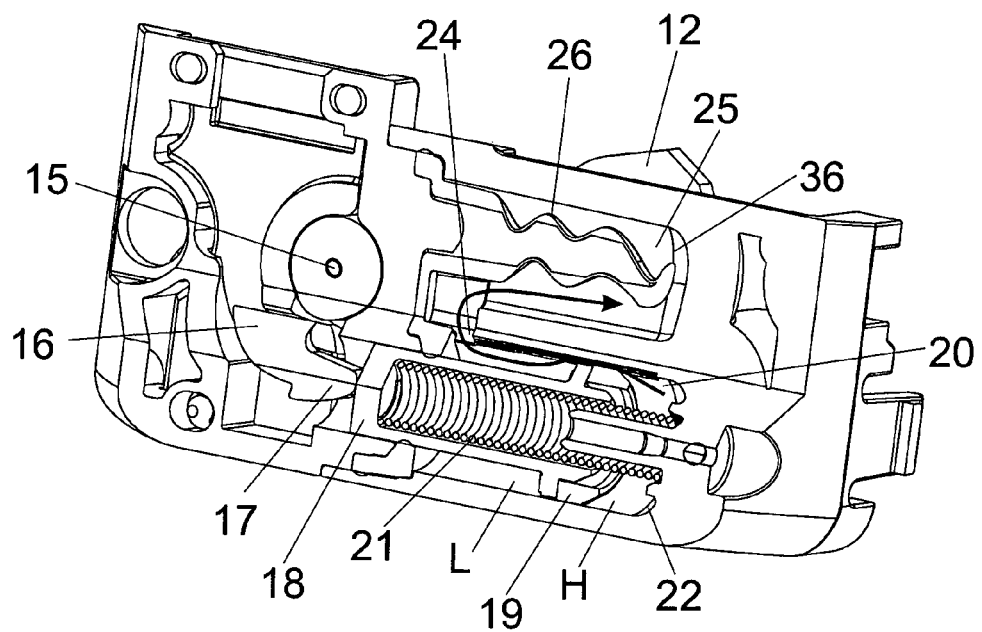

FIGS. 4a and 4b show two different sectional views of the damping device 7, the piston 19 being disposed near the rearward end position. A pivotal movement of the actuating element 12 also causes rotation of the lever 16, the lever end 17 of which presses the ram 18 (and therewith the piston 19) into the fluid chamber 20. Then—corresponding to the arrow shown in FIG. 4b—the displaced damping fluid can flow starting from the high-pressure side (H) laterally past the piston 19 to the low-pressure side (L) and through the passage 24 into the compensating chamber 25, whereby the compensating body 26 is deformed and thus the volume of the inwardly moving ram 18 is compensated. The air displaced in the compensating body 26 can flow out of the opening 27 (FIG. 4a). After the damping stroke movement has occurred, the return spring 21 can return the piston 19 again, in which case due to the reduced pressure caused thereby, the damping fluid can flow from the compensating chamber 25 back again into the fluid chamber 20 and the compensating body 26 can again assume the original form (FIG. 3a) due to air flowing in through the opening 27. The passage 24 can lead from that end region of the fluid chamber 20, that is away from the end 22 of the fluid chamber 20, to the compensating chamber 25. The passage 24 then opens into that end region of the compensating chamber 25, that is away from the end 36 of the compensating chamber 25. The advantage of the passage 24 extending from the low-pressure side (L) is its short length leading to the compensating chamber 25, whereby the risk of leakage is substantially eliminated. In addition, the compensating body 26 is deformable in a defined fashion by virtue of being acted upon from the low-pressure side (L) and can thus be adapted to the respectively prevailing fluid pressure in an improved fashion.

Figure 5A:
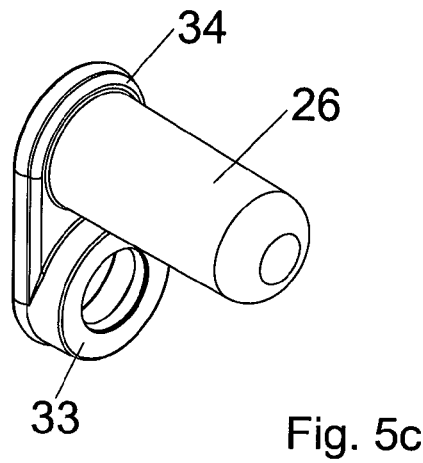
FIGS. 5a-5c show various views of the compensating body which is in one piece with the seal of the fluid chamber and with the seal of the compensating chamber.
Figure 5B:
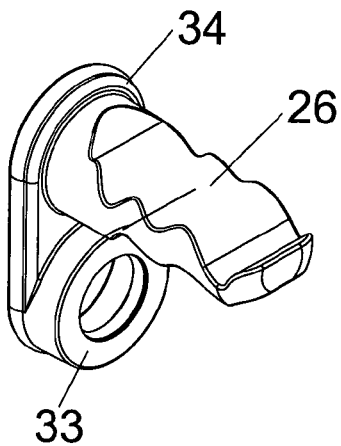
Figure 5C:
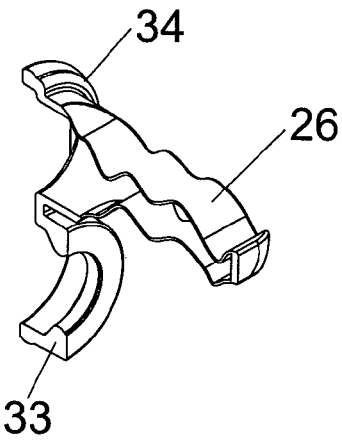

FIGS. 5a-5c show various views of the compensating body 26. FIG. 5a shows the compensating body 26 in the rest position, which in this operative condition is of a bag-shape configuration. The compensating body 26 together with the seal 33 (which seals off the ram 18 relative to the damper housing 10) and the sealing body 34 (which seals off the compensating chamber 25 relative to the damper housing 10) is of a common structural unit in the form of a one-piece configuration. FIG. 5b shows the compensating body 26 in the compressed condition, while FIG. 5c shows the compensating body 26 which is of a hollow configuration, the sealing body 34 and the seal 33 in a sectional view.

Figure 6:
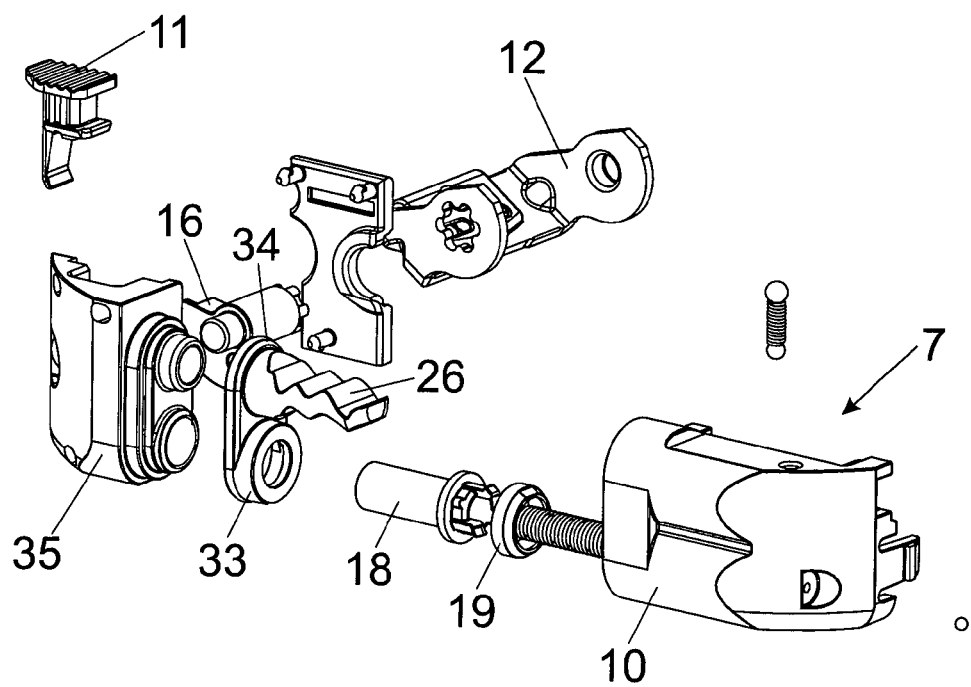
FIG. 6 shows an exploded view of the damping device and parts of the furniture hinge.

FIG. 6 shows an exploded view of the damping device 7, wherein the fluid chamber 20 and the compensating chamber 25 which extends in laterally parallel relationship therewith are provided within the damper housing 10. It is possible to see the actuating element 12 which in the mounted position is non-rotatably connected to the lever 16. The ram 18 is connected to the piston 19, the ram 18 being sealed off relative to the damper housing 10 by means of the seal 33 which is formed in one piece together with the sealing body 34 of the compensating chamber 25 and the elastically compressible compensating body 26. The end of the piston rod or ram 18, that is remote from the piston, is led out of the fluid chamber 20 in the assembled condition and projects into a closure portion 35.

Figure 7A:
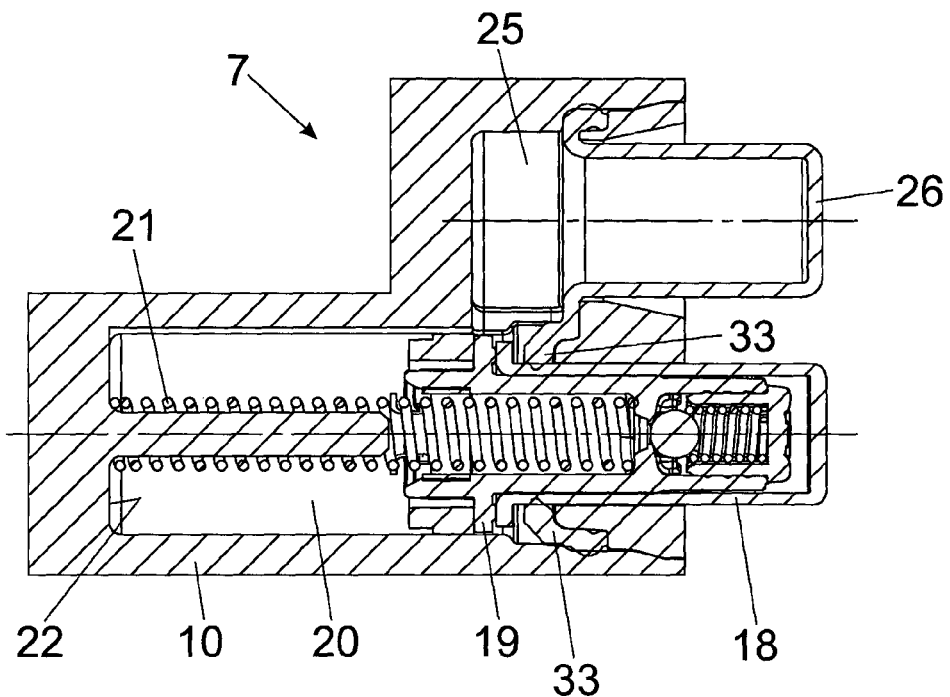
FIGS. 7a and 7b show a cross-section of the damping device of a further embodiment.
Figure 7B:
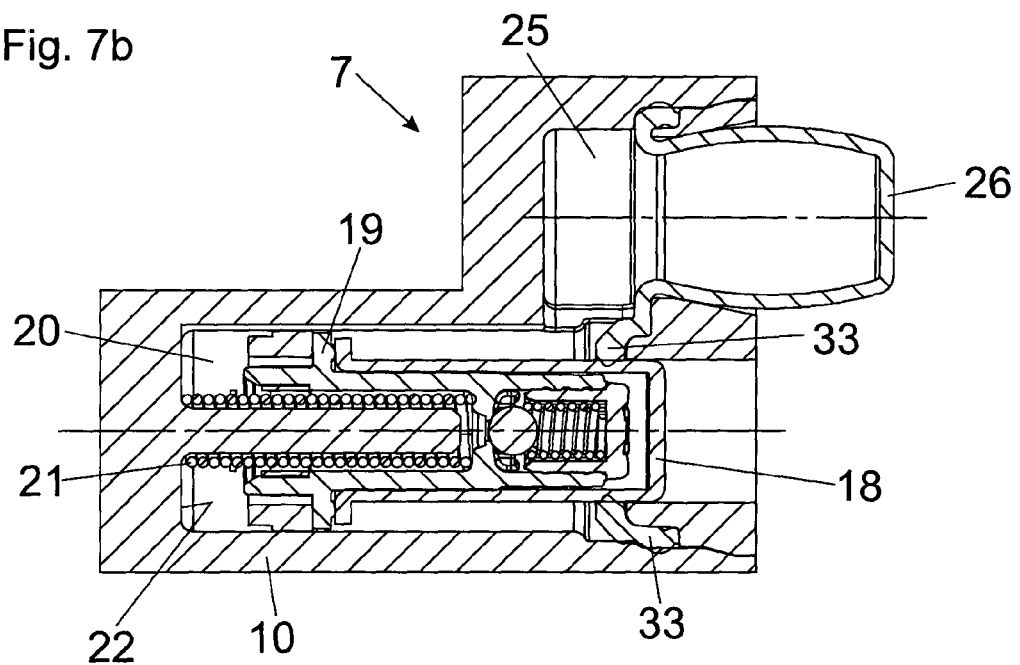

FIGS. 7a and 7b show cross-sectional views of a further embodiment of the damping device 7. FIG. 7a shows the damping device 7 with a ram 18 in the ready position, whereas FIG. 7b shows the ram 18 or piston 19 in the position of being pressed into the fluid chamber 20. A fluid chamber 20 and a compensating chamber 25 extending in laterally parallel relationship therewith are provided within the damper housing 10. The seal 33 which is provided for sealing off the fluid chamber 20 and through which the ram 18 passes, is formed in one piece together with the deformable compensating body 26. In the illustrated embodiment, the bag-form compensating body 26 is so arranged that—relative to the end 22 of the fluid chamber 20—it faces in a direction in opposite relationship thereto and projects out of the damper housing 10. When now the ram 18 is pressed into the fluid chamber 20, the displaced damping fluid passes into the interior of the compensating body 26 and—as shown in FIG. 7b—causes it to bulge out in a direction transversely relative to the damping stroke movement of the piston 19. After the damping stroke movement has occurred, the piston 19 can be moved back again into the ready position of FIG. 7a by the force of a return spring 21.

Figure 8A:
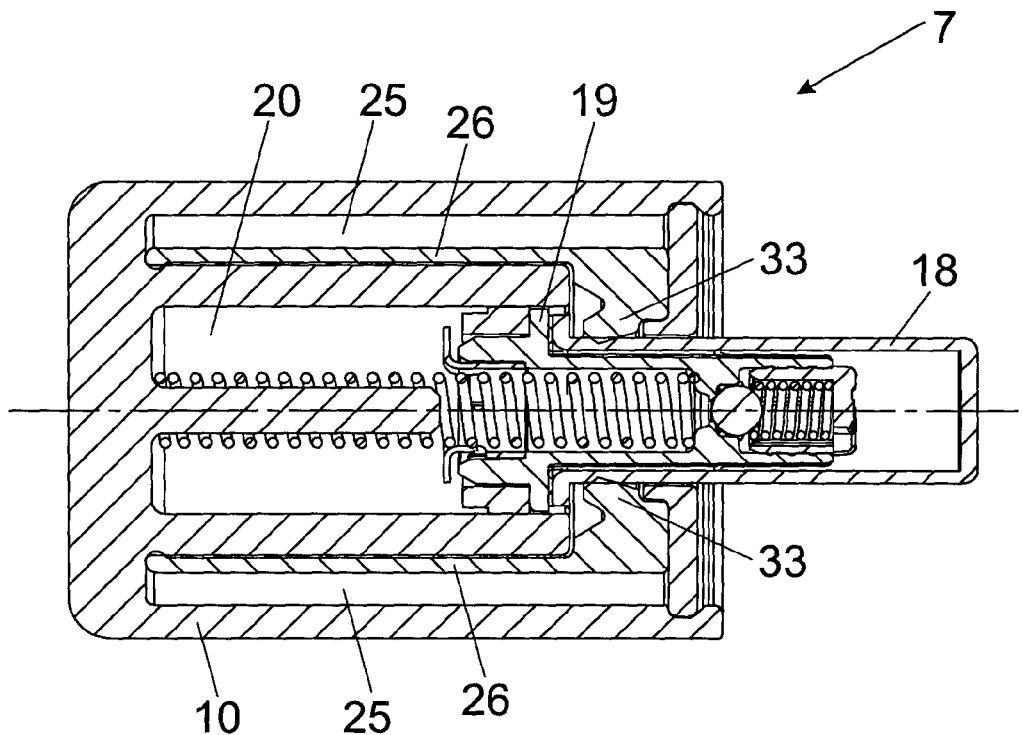
FIGS. 8a and 8b show a cross-section of the damping device in a further embodiment.
Figure 8B:
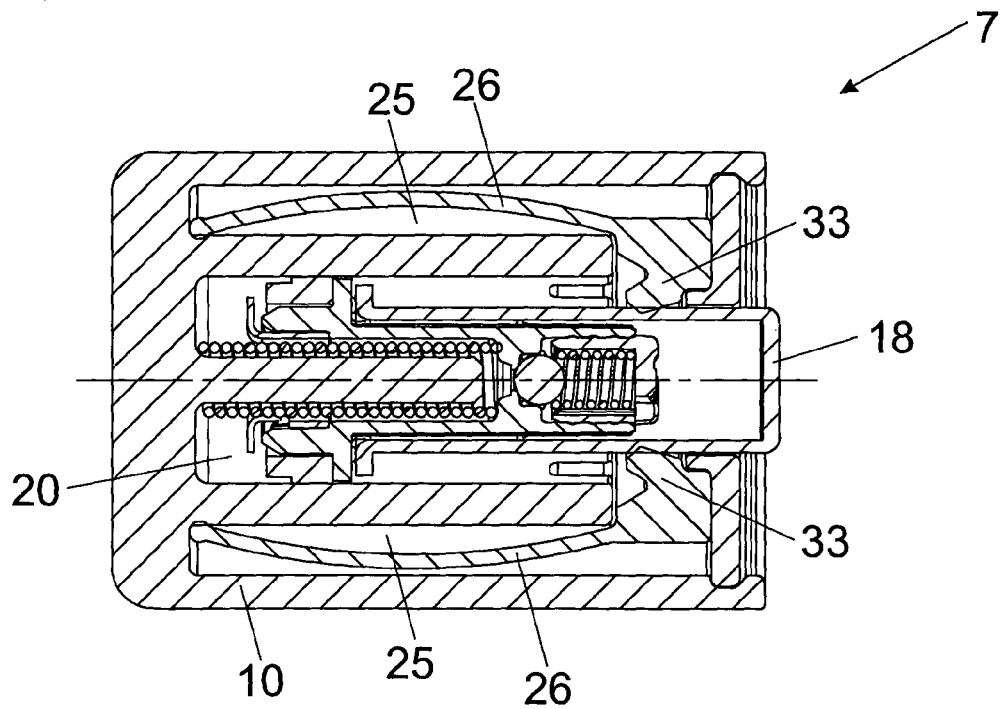

FIGS. 8a and 8b show a cross-section of the damping device 7 in a further embodiment. Provided in the damper housing 10 is a fluid chamber 20 with a piston 19 mounted displaceably therein, the piston 19 being connected to the ram 18. Arranged concentrically relative to the fluid chamber 20 is a compensating chamber 25 surrounding the fluid chamber 20—preferably in an annular configuration. The seal 33 for sealing off the fluid chamber 20, through which the ram 18 passes, is provided in one piece with the deformable compensating body 26. FIG. 8a shows the damping device 7 with the ram 18 in a ready position. When now the ram 18 is pressed into the fluid chamber 20, the displaced damping fluid passes into the compensating chamber 25 and causes the compensating body 26 which is of a sleeve-like configuration to bulge out in the radial direction. The direction of the maximum expansion of the compensating body 26 extends in that case substantially in a direction at a right angle to the damping stroke movement of the piston 19.

The present invention is not just limited to the illustrated embodiments but includes or extends to all variants and technical equivalents which can fall within the scope of the appended claims. The positional references adopted in the description such as for example up, down, lateral and so forth are also related to the directly described and illustrated Figure and are to be appropriately transferred to the new position upon a change in position. The compensating chamber 25 is preferably separated from the fluid chamber 20 but it can also be integrated into same. The piston 19 can also be provided with at least one opening, through which the damping fluid can flow through the piston 19 between the high-pressure side (H) and the low-pressure side (L).

The invention claimed is:

1. A damping device for moveable furniture parts, comprising:
    a damper housing,
    a fluid chamber which is arranged in the damper housing and in which a piston is moveably supported,
    a ram connected to the piston, wherein arranged between the damper housing and the ram is at least one seal for sealing off the fluid chamber, wherein the ram passes through the seal, and
    a compensating chamber which is in fluid-conducting relationship with the fluid chamber and which extends laterally parallel to the fluid chamber and in which there is arranged at least one deformable compensating body for compensation for a change in volume by virtue of the ram immersing into the fluid chamber,
wherein the deformable compensating body and the at least one seal have a one-piece configuration.

2. The damping device according to claim 1, wherein the compensating body is in the form of a hollow body filled with air.

3. The damping device according to claim 1, wherein the compensating body at least partially has a substantially bag-form configuration.

4. The damping device according to claim 1, wherein in the rest position, the compensating body substantially completely fills the compensating chamber and is compressible in a damping stroke movement.

5. The damping device according to claim 1, wherein the damper housing has an opening through which air in the compensating body can flow out and through which air can flow into the compensating body in a return movement of the piston.

6. The damping device according to claim 1, wherein the fluid chamber has a first longitudinal axis and the compensating chamber has a second longitudinal axis, and the first longitudinal axis of the fluid chamber and the second longitudinal axis of the compensating chamber extend in substantially mutually parallel relationship.

7. The damping device according to claim 1, wherein a sealing body is arranged in the compensating chamber to seal off the compensating chamber, and the compensating body, the seal, and the sealing body jointly have a one-piece configuration.

8. The damping device according to claim 1, wherein arranged in the fluid chamber is a return spring by which the piston can be returned again after a damping stroke movement into a ready position provided for the next damping stroke movement.

9. The damping device according to claim 1, wherein between the piston and the inside wall of the fluid chamber is a gap, through which the damping fluid flows laterally past the piston in the damping stroke movement.

10. The damping device according to claim 1, wherein there is provided an overload prevention means, by which above a threshold value of a pressure acting on the ram, at least one overload opening between the fluid chamber and the compensating chamber is openable.

11. The damping device according to claim 1, wherein the fluid chamber and the compensating chamber are connected together by way of at least one passage, and the passage leads to the compensating chamber starting from an end region of the fluid chamber, located away from an end of the fluid chamber.

12. The damping device according to claim 11, wherein the passage opens into that end region of the compensating chamber located away from an end of the compensating chamber.

13. A furniture hinge comprising at least one damping device according to claim 1 for damping a movement of the furniture hinge.

14. The furniture hinge according to claim 13, wherein the furniture hinge has a hinge cup and a carcass-side fitment portion hingedly connected thereto for fixing to the respective furniture parts, and the damping device is mounted on or in the hinge cup.

15. The furniture hinge according to claim 14, wherein during a hinge movement, the ram of the damping device can be acted upon by the fitment portion or by an actuating element positively coupled to the hinge movement, whereby the piston can be pressed into the fluid chamber.

* * * * *